United States Patent [19]

Hashimoto et al.

[11] Patent Number: 5,585,788
[45] Date of Patent: Dec. 17, 1996

[54] DATA TRANSMISSION SYSTEM FOR AUTOMOTIVE VEHICLES

[75] Inventors: Hiroshi Hashimoto; Yuji Nagatani, both of Wako, Japan

[73] Assignee: Honda Giken Kogyo K.K. (Honda Motor Co., Ltd. in English), Tokyo, Japan

[21] Appl. No.: 321,306

[22] PCT Filed: Apr. 13, 1993

[86] PCT No.: PCT/JP93/00473

§ 371 Date: Oct. 11, 1995

§ 102(e) Date: Oct. 11, 1995

[87] PCT Pub. No.: WO93/21713

PCT Pub. Date: Oct. 28, 1993

[30] Foreign Application Priority Data

Apr. 13, 1992 [JP] Japan .................................. 4-119689

[51] Int. Cl.⁶ .................................................. H04Q 1/00
[52] U.S. Cl. .................... 340/825.5; 370/450; 370/462
[58] Field of Search ........................ 340/825.5, 825.06, 340/825.05; 370/85.1, 85.5, 85.6, 85.4

[56] References Cited

U.S. PATENT DOCUMENTS

| | | | |
|---|---|---|---|
| 5,263,163 | 11/1993 | Holt et al. | 340/825.5 |
| 5,311,172 | 5/1994 | Sadamori | 340/825.5 |
| 5,335,226 | 8/1994 | Williams | 370/85.1 |

*Primary Examiner*—Michael Horabik
*Attorney, Agent, or Firm*—Arthur L. Lessler

[57] ABSTRACT

A data transmission system for automotive vehicles in which messages are transmitted by circulating a transmission right signal among a plurality of electronic control units, by a token passing method. Each of the electronic control units judges that the right to transmit a message to the network bus has been acquired when it is determined that the transmission right signal has not been circulated for a predetermined time period, and at the same time an idle state of the network bus has been detected. If a collision of the transmitted message with any other message is detected, the above process is repeated after the lapse of a waiting time period specific to the electronic control unit which judged that the right to transmit a message had been acquired.

2 Claims, 10 Drawing Sheets

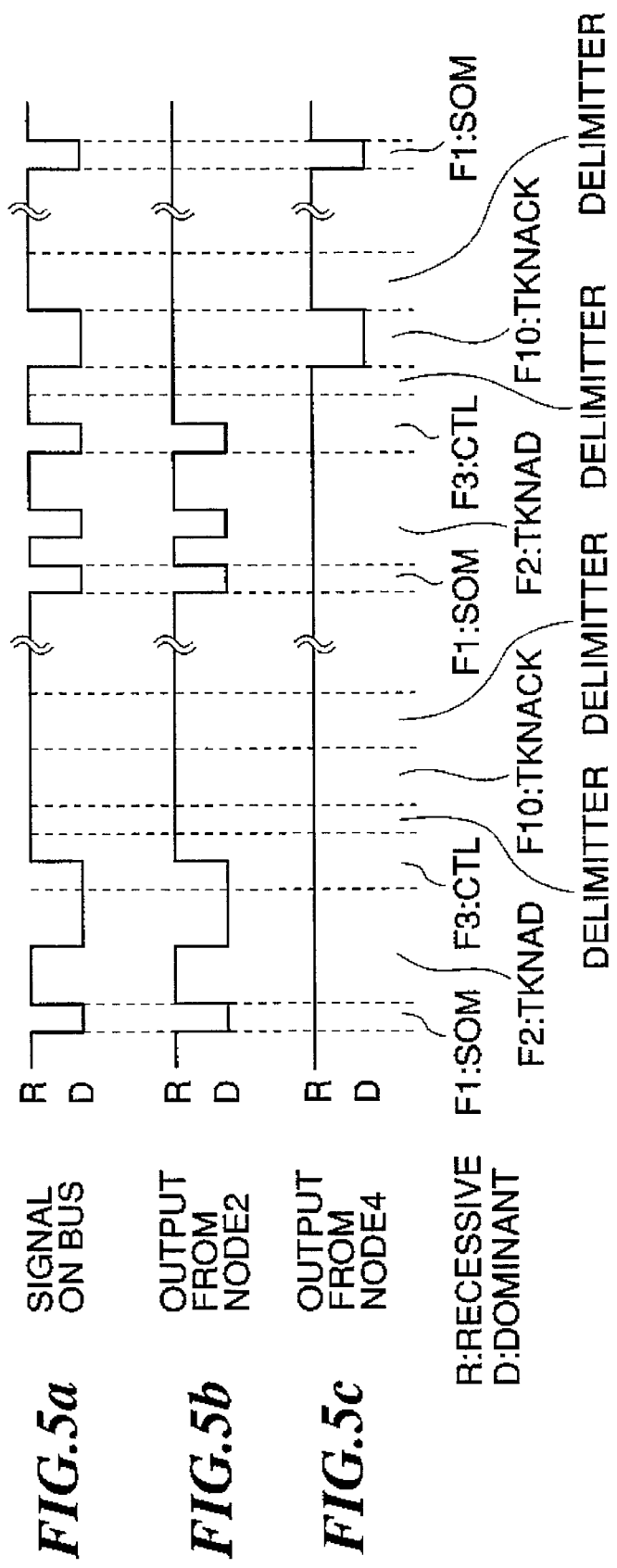

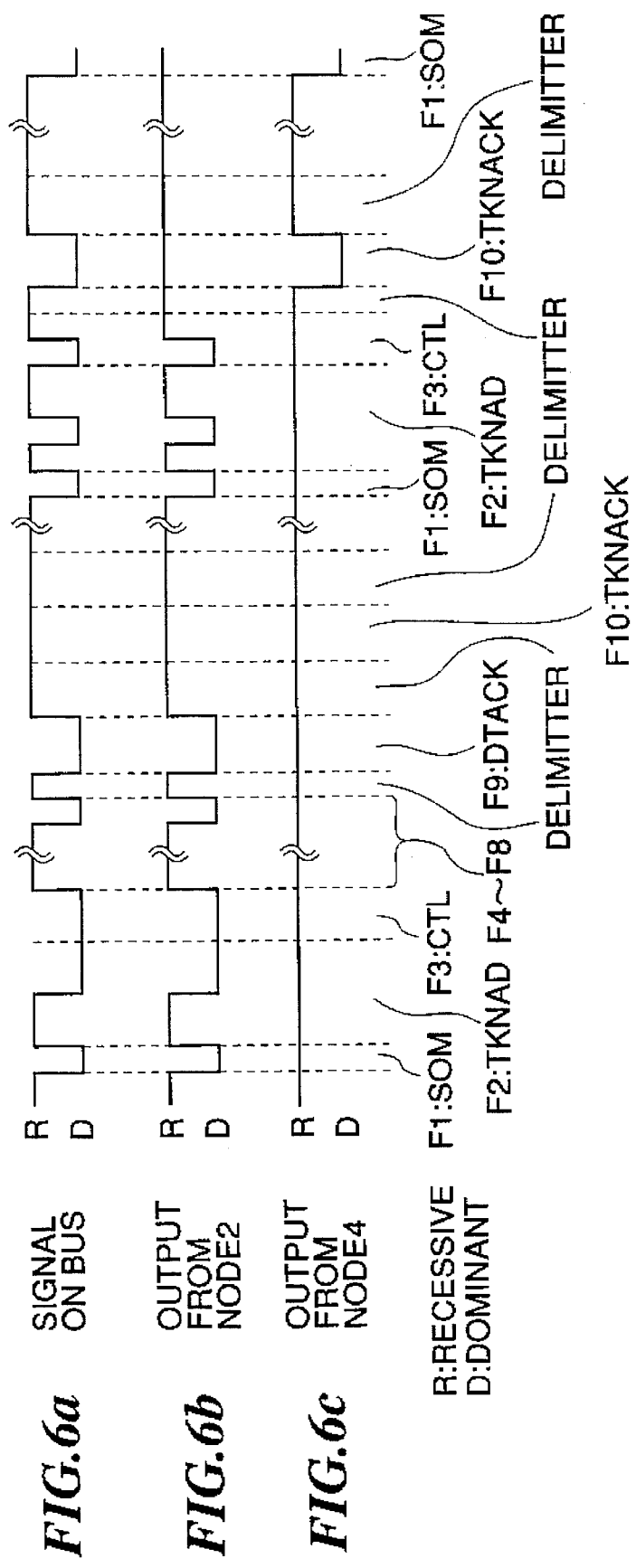

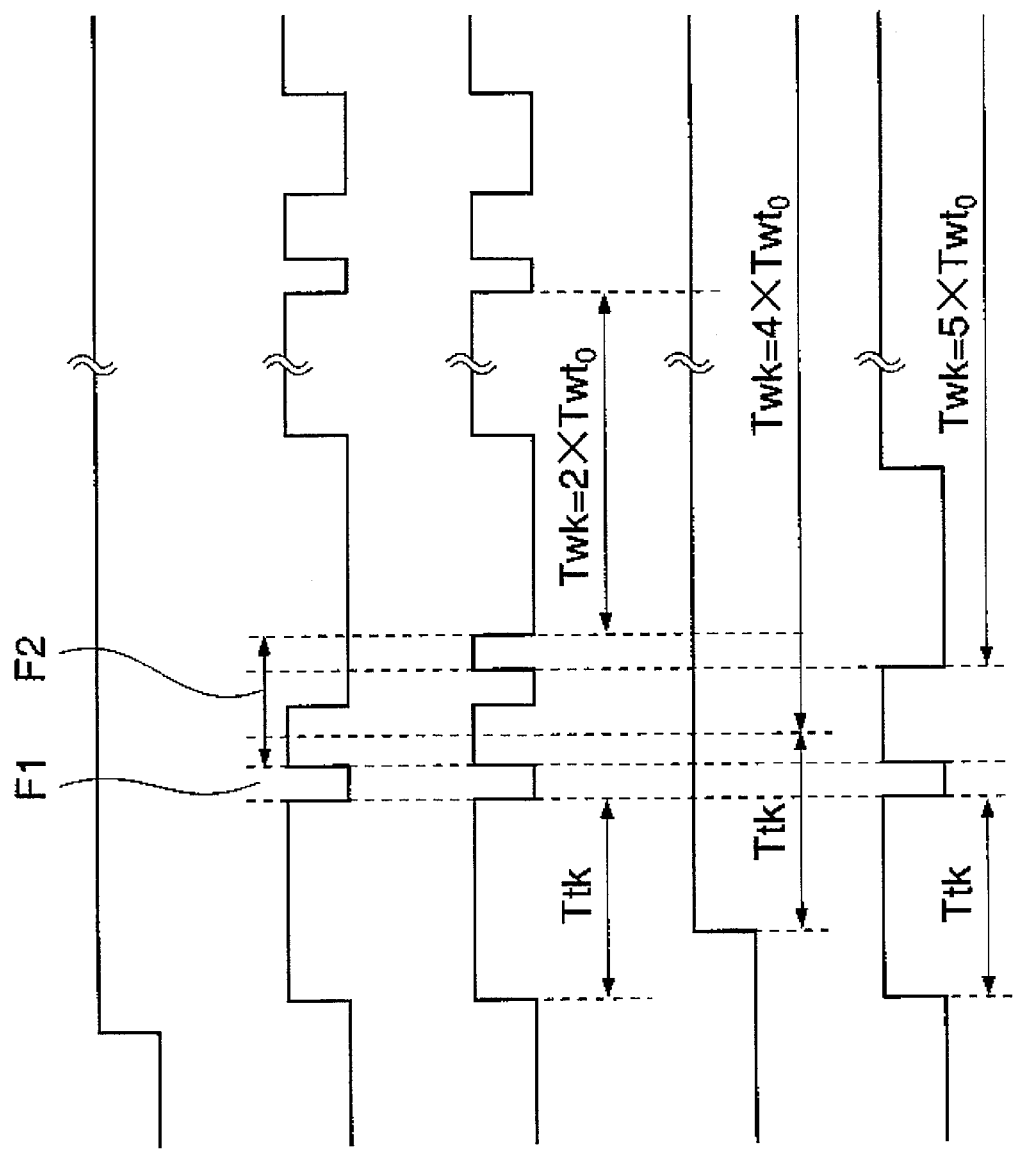

ID
DATA TRANSMISSION SYSTEM FOR AUTOMOTIVE VEHICLES

TECHNICAL FIELD

This invention relates to a data transmission system comprising a plurality of electronic control units installed on a vehicle, such as an automotive vehicle, and a common communication line connecting between these electronic control units.

BACKGROUND ART

Conventionally, in performing mutual data transmission between a plurality of electronic control units (hereinafter referred to as the "ECU's") via a common communication line (hereinafter referred to as "the network bus") connecting between the ECU's, there is known a method (token passing method) which circulates a transmission right between the ECU's in a predetermined sequence to permit only the ECU having received the transmission right to send out data to the network bus.

In a data transmission system employing the token passing method, if the first ECU to acquire the transmission right e.g. when the power is turned on, is fixed, there arises a problem that the circulation of the transmission right is not started if the first ECU does not become operative from some cause. To solve this problem, a data transmission system has been proposed by Japanese Provisional Patent Publication (Kokai) No. 63-88930, in which a plurality of ECU's are set to respective waiting time periods, and when a waiting time period set for one ECU has elapsed after the power is turned on, the one ECU acquires the transmission right if the other ECU's is not then sending out data to the network bus.

According to the proposed system, the waiting time periods for the respective ECU's have to be set to fairly different values from each other to avoid overlapping of the data transmission timing, since the ECU's are different in rise time, i.e. a time period to elapse from the time the power is turned on (or the system is reset) to the time each ECU actually becomes operative. This causes a problem that a long time period elapses before generation of the transmission right (acquisition of the transmission right by any one of the ECU's).

Further, even if the transmission right is generated after the power is turned on, if an ECU having the transmission right ceases to operate, the transmission right disappears without being sent to any other ECU. The above proposed system does not take this disadvantage into consideration, and hence cannot cope with such a problem.

The present invention has been made in view of the problems described above, and it is the object of the invention to provide a data transmission system which is capable of generating the transmission right in a short time both when the power is turned on and when the transmission right has disappeared.

DISCLOSURE OF THE INVENTION

The present invention provides a data transmission system for an automotive vehicle for transmitting messages between a plurality of control units installed on the automotive vehicle, by connecting the control units with each other by a network bus and circulating a transmission right therebetween. As shown in FIG. 10 each of the control units connected by the network bus 6 comprises transmission right circulation-means 201 for determining that the transmission right has not been circulated for a predetermined time period, idle state-detecting means 202 for detecting an idle state of the network bus 6, message-transmitting means 203 for judging that the each control unit has acquired the transmission right when it is determined that the transmission right has not been circulated for the predetermined time period, and at the same time the idle state of the network bus is detected, to transmit a message to the network bus 6, collision-detecting means 204 for detecting a collision of the message transmitted therefrom with any other message, and waiting time period-setting means 205 for setting a waiting time period specific to the each unit. The message-transmitting means 203 inhibits transmission of the message if the collision of the message has been detected, and carries out the message-transmitting processing again if the network bus 6 is idle after the waiting time period has elapsed.

Further, it is preferable that the waiting time period-setting means 205 determines the waiting time period according to a value (e.g. node address) specific to the each control unit.

When one control unit determines that the transmission right has not been circulated for the predetermined time period, and that the network bus 6 is idle, the one control unit judges that it has acquired the transmission right, and starts to transmit a message.

If a collision of the message with any other message is detected during transmission of the message, the message-transmitting processing is carried out again after the lapse of a waiting time period specific thereto.

Further, the waiting time period is set according to the node address of the control unit.

BRIEF DESCRIPTION OF THE DRAWINGS

FIGS. 5a to 5c constitute a timing chart for explaining transfer of a token by a token message;

FIGS. 6a to 6c constitute a timing chart for explaining transfer of the token by a data message;

FIGS. 9a to 9c constitute a timing chart useful in explaining the transmission right-generating processing.

BEST MODE FOR CARRYING OUT THE INVENTION

Hereafter, the invention will be described in detail with reference to the drawings attached hereto.

Figure 1:
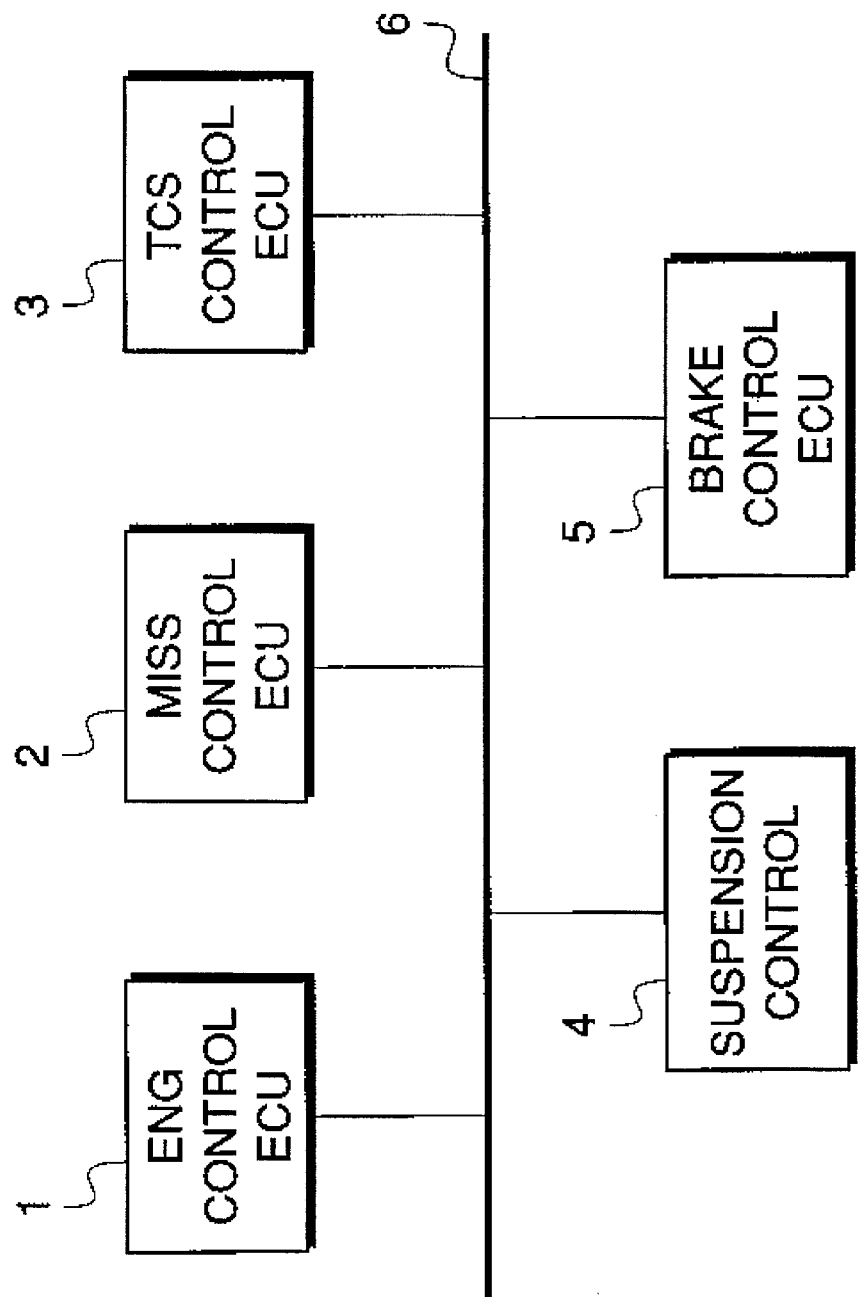
FIG. 1 is a block diagram showing the whole arrangement of a control system for an automotive vehicle according to one embodiment of the invention.

FIG. 1 shows the whole arrangement of a control system for an automotive vehicle according to one embodiment of the invention, which is comprised of electronic control units (hereinafter referred to as "the ECU's") 1 to 5 connected with each other via a network bus 6. An ENG control ECU 1 controls the operation of an engine in response to operation of an accelerator pedal operated by a driver of the vehicle, etc. An MISS control ECU 2 controls an automatic transmission of the vehicle according to driving conditions of the vehicle. A TCS control ECU 3 detects a slip of driving wheels and controls output torque of the engine. A suspension control ECU 4 controls a suspension (active suspension) system of the vehicle depending on driving conditions of the vehicle. A brake control ECU 5 detects a locked state of wheels and carries out braking control. These ECU's 1 to 5 are required to mutually monitor control parameters and operating parameters detected by sensors, and to this end they are connected to each other by way of the network bus 6 for transmission of data needed by each other.

Figure 2:
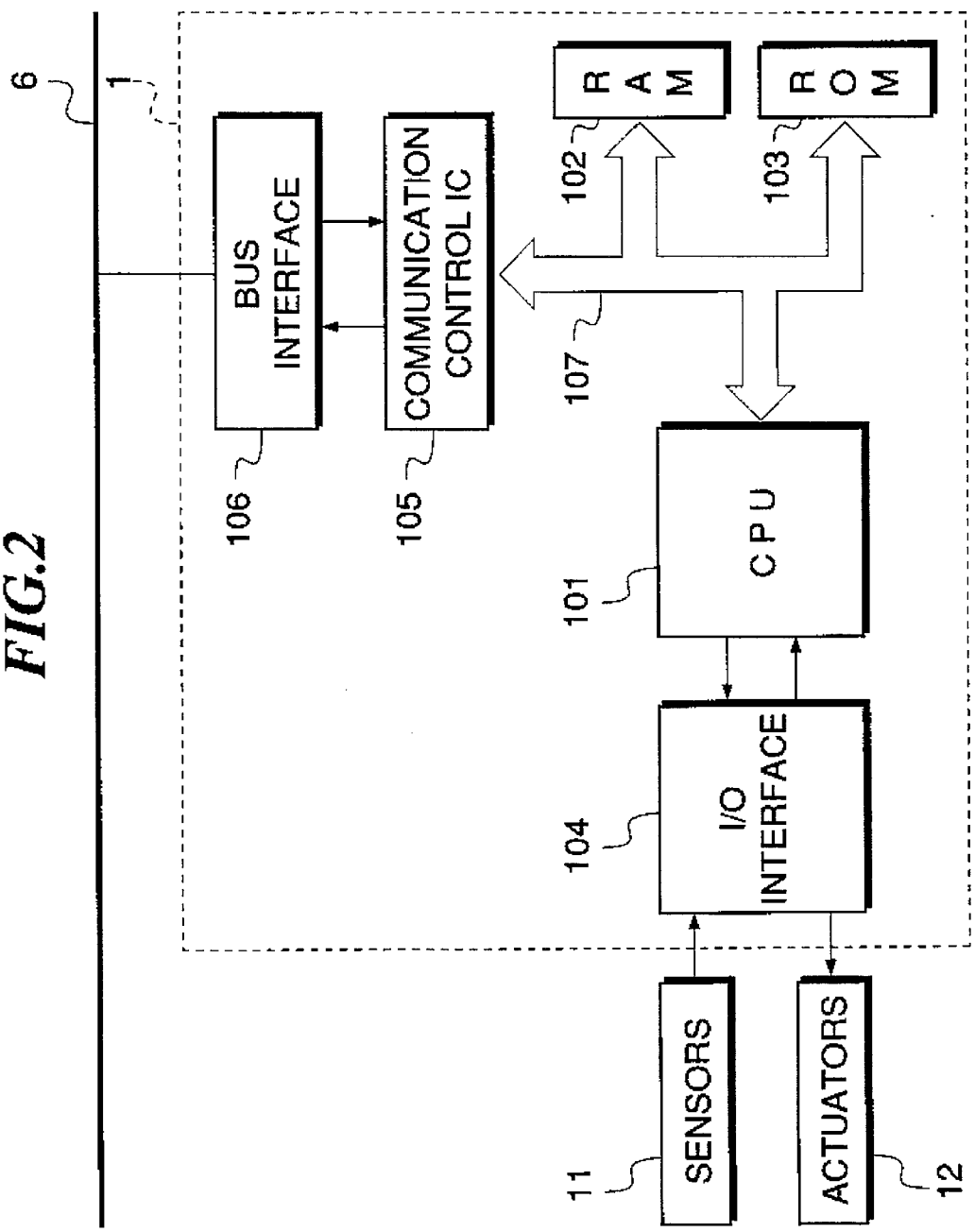
FIG. 2 is a block diagram showing the arrangement of an electronic control unit constituting the system of FIG. 1.

FIG. 2 is a block diagram showing the arrangement of the ENG control ECU 1 which is comprised of a central processing unit (hereinafter referred to as "the CPU") 101, which is connected via an input/output interface 104 to a plurality of sensors 11, and a plurality of actuators 12, such as fuel injection valves. The CPU 101 is connected via a bus line 107 to a RAM (Random Access Memory) 102, a ROM (Read Only Memory) 103, and a communication control IC (Integrated Circuit) 105. The communication control IC 105 is connected via a bus interface 106 to the network bus 6.

The CPU 101 determines control parameters based on detection values from the sensors 11 according to a program stored in the ROM 103, thereby driving the actuators 12. The RAM 102 temporarily stores data of results of computation. The communication control IC controls transmission of a message to the network bus and reception of a message from the network bus.

Figure 3:
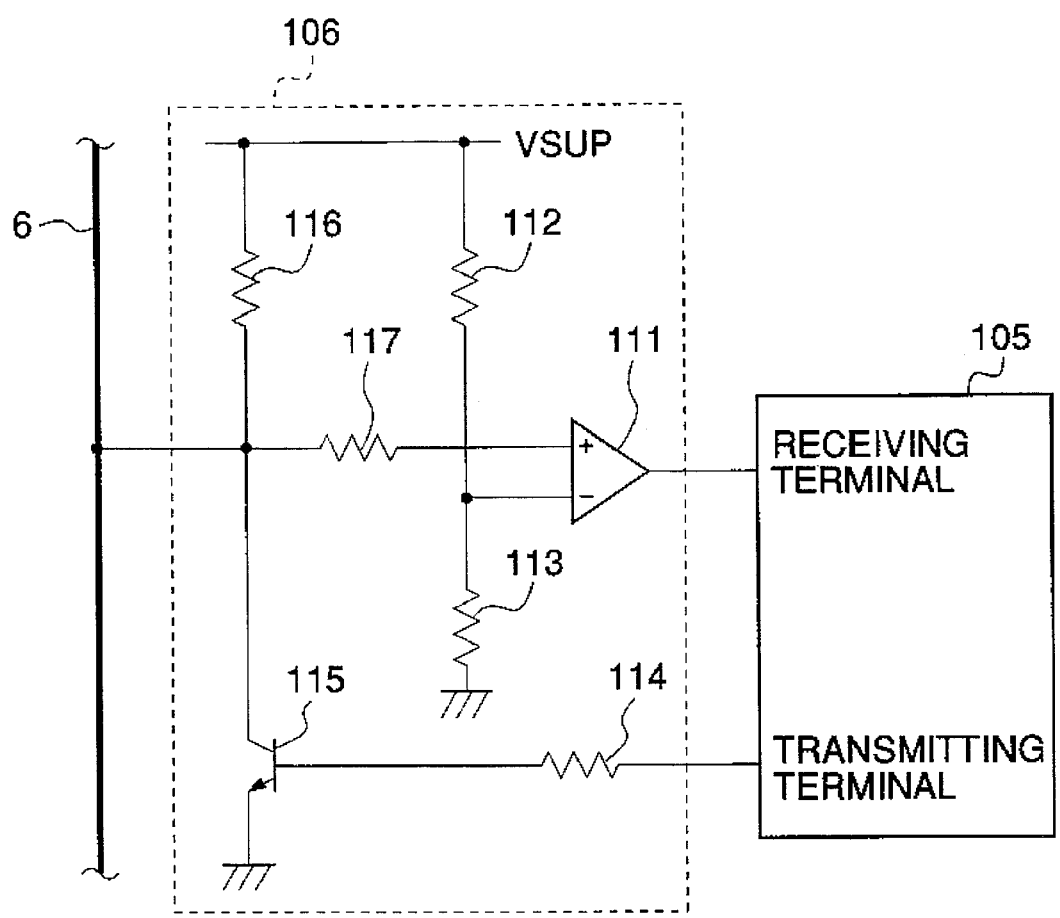
FIG. 3 is a diagram showing details of a bus interface appearing in FIG. 2.

FIG. 3 shows details of the arrangement of the bus interface 106, in which the communication control IC has a transmitting terminal thereof connected via a resistance 114 to a base of a transistor 115. The transistor 115 has an emitter thereof connected to ground, and a collector thereof connected to the network bus 6 as well as to a power supply line VSUP via a resistance 116 and to a non-inverting input terminal of a comparator 111 via a resistance 17. The comparator 111 has an inverting input terminal thereof connected to ground via a resistance 113, and to the power supply line VSUP via a resistance 112. The comparator has an output thereof connected to a receiving terminal of the communication control IC 105.

With the arrangement of FIG. 3, as the level of a signal on the network bus 6 goes high/low, the output from the comparator 111 turns high/low in a corresponding manner, thereby enabling the communication control IC 105 to receive the signal on the bus 6. Further, as the level of an output signal from the transmitting terminal of the communication control IC 105 goes high/low, the collector of the transistor 115 turns low/high, thereby sending out a signal to the network bus.

The ECU's 2 to 5 basically have the same arrangement as the ECU 1. Therefore, even if one of the ECU's sends out a signal at a high level to the network bus 6, when another ECU sends out a signal at a low level to same, the resulting signal loaded on the network bus is at a low level. That is, according to the present embodiment, a signal at a low level is dominant, whereas a signal at a high level is recessive.

Next, a method of data transmission between the ECU's will be described. In the present embodiment, a token passing method is employed. This contemplates the fact that compared with a CSMA/CD (Carrier Sense Multiple Access with Collision Detection) method which is capable of settling a collision of messages, the token passing method is advantageous in respect of an electric delay on the network bus, and is capable of easily determining the maximum message delay time period, facilitating designing of the network system.

Figure 4A:
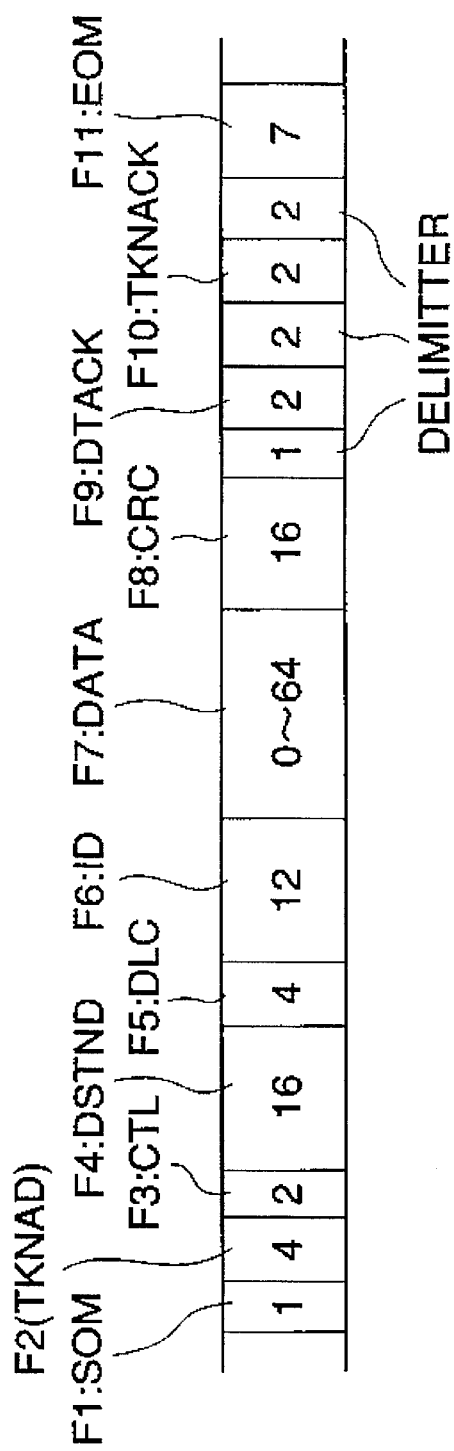
FIGS. 4a and 4b constitute a diagram showing the construction of a message transmitted and received between electronic control units.
Figure 4B:
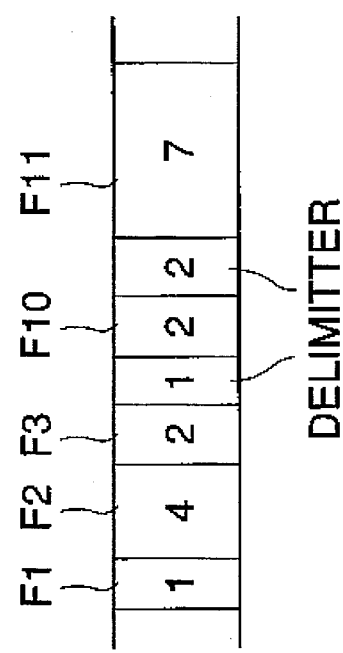

FIG. 4 shows formats of messages used in data transmission in the present embodiment. FIG. 4(a) shows a format of a data message for sending a token and data, while FIG. 4(b) shows a format of a token message for sending the token alone. In the following description, the ECU's 1 to 5 constituting the network system will be referred to as the nodes 1 to 5.

In FIG. 4(a), a field F1 (SOM) designates the start of a message, which is formed by one dominant bit. This field is used for synchronization of operations of all the nodes constituting the network system.

A field F2 (TKNAD) is of four bits designating an address of a destination node to which the token is to be transferred. The node addresses are set e.g. to values 0 to 4 corresponding respectively to the ECU's 1 to 5.

A field F3 (DSTND) is of 16 bits designating a node to receive data of the message. One bit is assigned to each node, and a bit corresponding to a node to receive the data is set to logic "1". For example, if the addresses of nodes to receive data are 1 and 4, the second bit of the field F4 and the fifth bit of same are set to logic "1". In this connection, in the present embodiment, the number of nodes is 5, and hence 11 bits of the 16 bits of this field are not used. However, by taking an expansion of the system (increase in the number of nodes) into consideration, the system is made adaptable up to a total of 16 nodes.

A field F5 (DLC) is of 4 bits designating the length of a data field (field F7). In the present embodiment, the length of data is represented by the number of bytes ranging from 0 to 8.

A field F6 (ID) is of 12 bits forming an identifier of data. All data have different identifiers set therefor.

A field F7 (DATA) is the data field which varies in length with contents of data. The maximum size of the field F7 is 64 bits.

A field F8 (CRC) is a CRC (Cyclic Redundancy Check) field of 16 bits comprised of a sequence (CRC character sequence) of characters for error detection, which is obtained by the use of the following equation (1) as a generating polynomial:

$$\text{Generating polynomial} = X^{16} + X^{12} + X^5 + 1 \qquad (1)$$

A delimiter (dividing character) of one recessive bit is interposed between the fields F8 and F9.

A field F9 (DTACK) is a field into which a data-acknowledging response is to be written by a node having normally or safely received the data, which is formed by an acknowledge slot of two bits. A sending node sends a message having the acknowledge slot as recessive bits, and a node or nodes which is/are designated in the message as one or ones to receive the information and has/have normally or safely received the data makes (make) the data-acknowledging response by overwriting two dominant bits into the acknowledge slot. A delimiter formed by two recessive bits is interposed between the fields F9 and F10.

A field F10 (TKNACK) is a field into which a token-acknowledging response is to be written by a node having normally or safely received the token, which is formed by an acknowledge slot of two bits, similarly to the field F9. A sending node sends a message having the acknowledge slot as recessive bits, and a node having received the token makes the token-acknowledging response by overwriting two dominant bits into the acknowledge slot. A delimiter formed by two recessive bits is interposed between the fields F10 and F11.

A field F11 (EOM) designates the end of the message, and is formed by seven recessive bits.

The token message shown in FIG. (4b) is formed such that the fields F4 to F8 are omitted compared with the data message, and a delimiter is interposed between the fields F3 and F10.

Next, a method of circulating the token will be described.

If a node having received the token has data or information to be transmitted, it has to transfer the token to a subsequent node together with the data. If the node has no data or information to be transmitted, it has to transmit the token alone to the subsequent node. A node to which the token is to be transferred is a node corresponding to the token address designated by the field F2 (TKNAD). Normally, the token address is first set by adding a value of 1 to the token address of the sending node itself, and the message continues to be sent out until a token-acknowledging response is detected, by progressively increasing the token address by an incremental value of 1. However, when the token address of the present node is equal to a value of 15, the token address is set to 0.

When the node corresponding to the token address set in the message has received the token, it overwrites two dominant bits into the acknowledge slot of the field F10 (TCNACK), thereby making the token-acknowledging response. When the token-acknowledging response is thus overwritten and the message normally terminates in the field F11 (EOM), the sending node having sent the token completes the transfer of the token, and the receiving node has acquired the token. Therefore, when an error has occurred during transmission of a message, the token is not transferred. Further, if the token-acknowledging response is not overwritten even when the transmission of the message is normally carried out up to the field F11 (EOM), the node having sent the token judges that the node corresponding to the token address does not exist in the network, and a value of 1 is added to the token address (however, when the resulting token address is equal to 16, the token address is set to a value of 0), thereby sending out the token again. This procedure is repeatedly carried out until the token-acknowledging response is received.

When the node having the token has no data to be transmitted, the token is transferred by the use of the token message shown in FIG. 4(b). For example, when a node having a node address of 2 should transmit a token message, the token address (field F2) is set to a value of 3 (0011B) as shown in FIG. 5, and a control bit (field F3) is set to 10B (dominant bit is set to 1, and recessive bit to 0), thereby sending the token message to the bus 6 (FIG. 5(a) and (b), left side).

When the token-acknowledging response is not overwritten into the acknowledge slot (due to failure of the node having the address 3, for example), the token address is set to a value of 4 (0100B), and then the token message is sent out again (FIG. 5, right side). In the example illustrated in the figures, when the token-acknowledging response is overwritten into the acknowledge slot by the node having the address 4, the token is transferred to the node having the address 4.

When the node having the token has data to be transmitted, the token is sent out by the use of the data message shown in FIG. 4(a). In this case, since the system is set such that the same node cannot send out the data message two consecutive times, it is necessary to add a value of 1 to the token address without fail before sending out the data message.

For example, when the node having the address 2 sends out the data message, the token address (field F2) is set to a value of 3 (0011B), and the control bit (field F3) is set to 11B, as shown in FIG. 6, and then the data message is sent out to the bus 6 (FIG. 6(a) and (b), left side).

When the token-acknowledge response is not overwritten into the acknowledge slot of the filed F10, the token address is set to a value of 4 (0100B), and the resulting token message is sent out (FIG. 6, right side). Similarly to the case shown in FIG. 5, if the token-acknowledging response is overwritten by the node having the address 4, the token is transferred to the node having the address 4.

Next, there will be described a manner of generating the token when the system rises (when the power is turned on).

Figure 7:
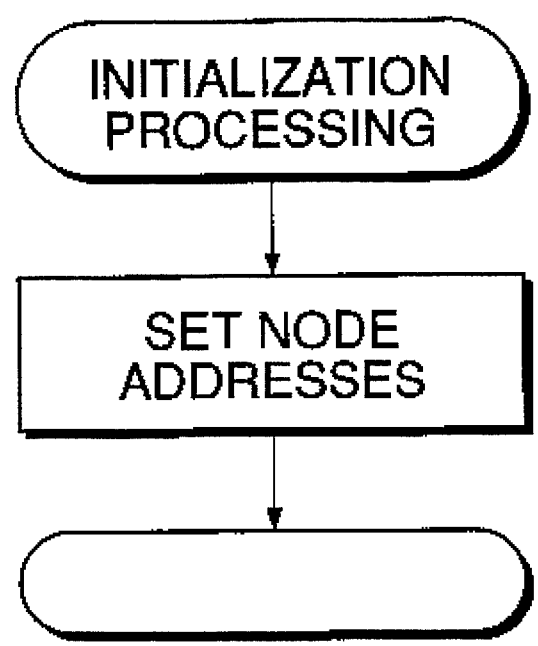
FIG. 7 is a diagram showing initialization processing executed by a central processing unit of an electronic control unit.

When the power is turned on, the CPU of each node sets node addresses during its initialization processing shown in FIG. 7, writes the node addresses into a node address register of the communication control IC, and enables the communication control IC. The communication control IC of each node executes a token-generating processing as shown in FIG. 8. This processing is executed in the background.

Figure 8A:
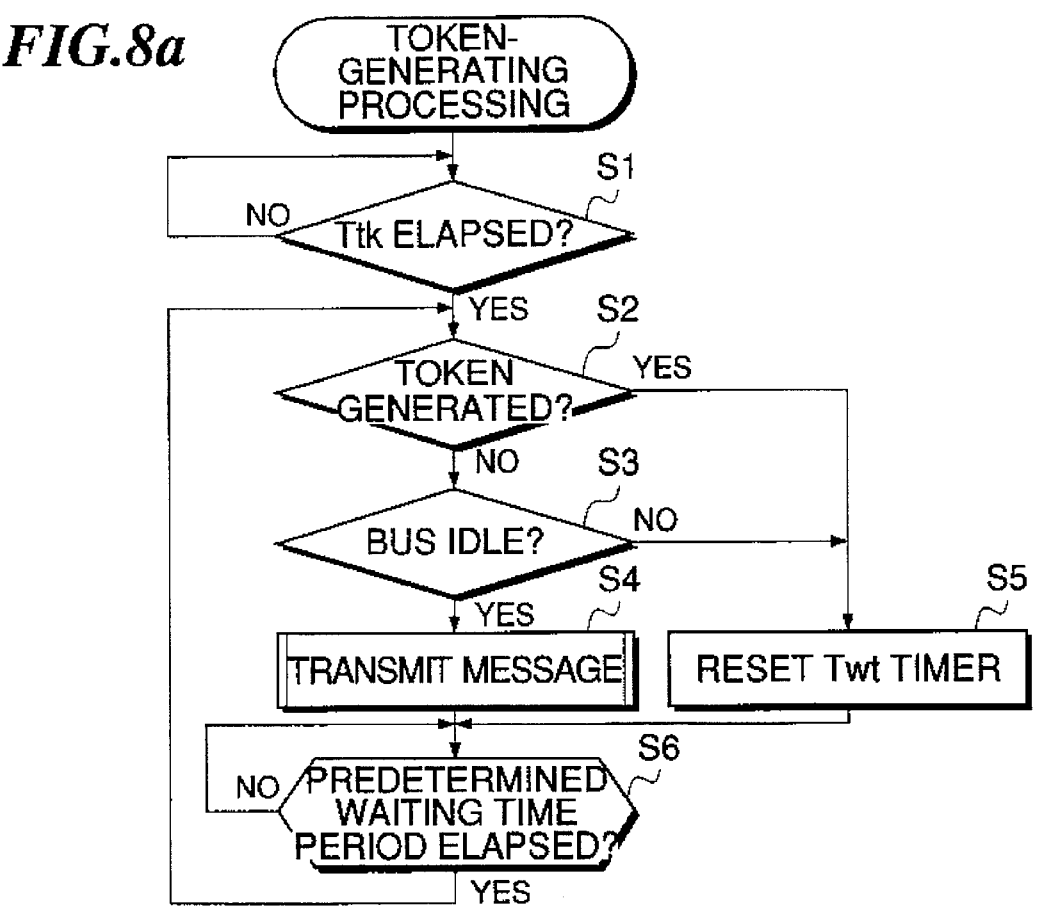
FIGS. 8a and 8b constitute a flowchart showing a procedure of transmission right-generating processing executed by a communication control IC of the electronic control unit.

Referring to FIG. 8(a), at a step S1, the communication control IC waits for a predetermined monitoring time period Ttk (e.g. 5 msec) to elapse, and then determines at a step S2 whether or not the token has been generated during this time period. If the answer to this question is negative (NO), i.e. if the token has not been generated during the predetermined monitoring time period Ttk, it is determined at a step S3 whether or not the network bus 6 is idle (in a no-signal state). In the present embodiment, the network bus 6, which is constantly monitored for a signal thereon, is determined to be idle when the signal on the network bus 6 continues to be recessive for consecutive eight bits. If the answer to the question of the step S2 is affirmative (YES) or if the answer to the question of the step S3 is negative (NO), i.e. if the token has been generated during the predetermined monitoring time period Ttk or if the network bus 6 is not idle, a Twt timer is reset at a step S5, whereby the communication control IC is caused to wait or be on standby for a predetermined waiting time period Twt to elapse at a step S6, followed by returning to the step S2.

The Twt timer measures the predetermined waiting time period Twt, which is calculated by the following equation (2):

$$Twt = (\text{node address} + 1) \times Twt0 \qquad (2)$$

Therefore, each node has a value of the predetermined waiting time period Twt specific thereto. For example, the node having the address 0 has a predetermined waiting time period Twt=Twt0, and the node having the address 3 has a predetermined waiting time period Twt=3Twt0. By setting values of the predetermined waiting time period Twt specific to respective nodes, the nodes are caused to wait or be on standby for different set waiting time periods when a collision of messages, described hereinafter, has occurred, which makes it possible to prevent collision of messages sent out after the lapse of a waiting time period.

Figure 8B:
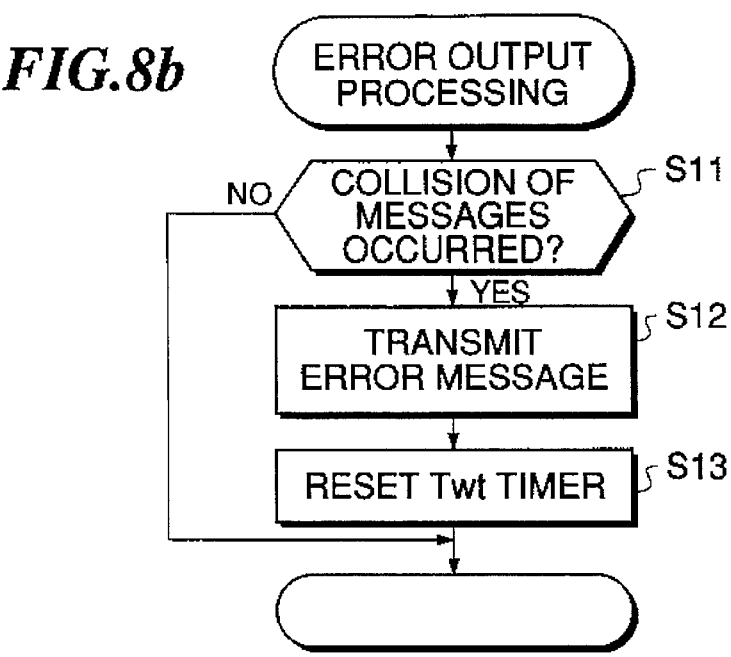
Figure 10:
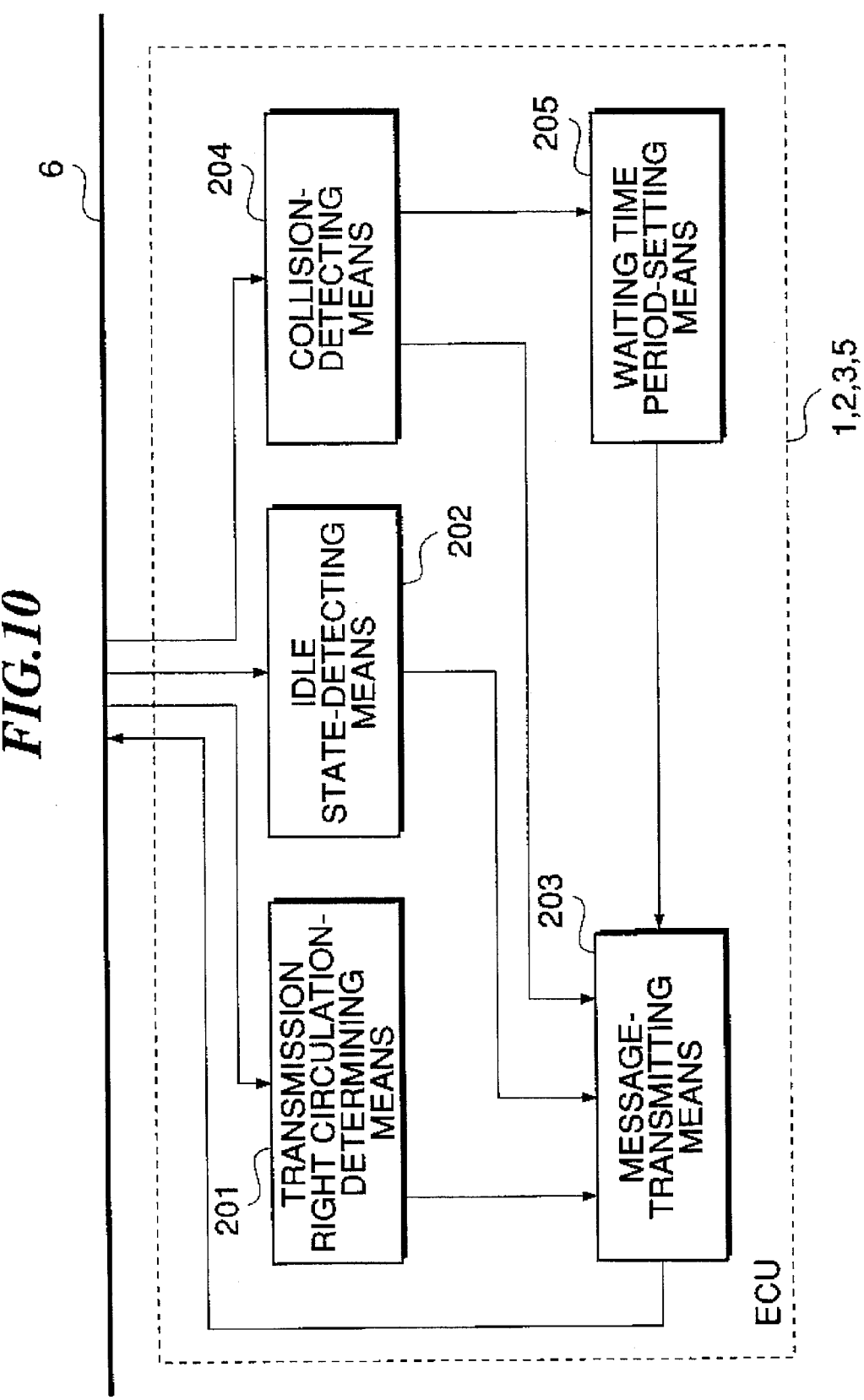
FIG. 10 is a block diagram showing means included in each of the electronic control units shown in FIG. 1.

If the answer to the question of the step S3 is affirmative (YES), i.e. if the bus 6 is idle, the node is determined to have acquired the token, and commanded to start sending out a message at a step S4. Then, as shown in FIG. 8(b), it is determined at a step S11 whether or not a collision of the message sent out with a message from another node has occurred. If the answer to this question is negative (NO), i.e. if no collision has occurred, it is finally determined that the token has been acquired by the node, and then the token is transferred to a subsequent node (the next node to acquire the token) by the message started to be transmitted at the step S4.

The detection of a collision of messages is effected by determining whether there occurs a disagreement between a message sent out by the present node to the bus and a message detected on the bus (i.e. between a signal at the transmitting terminal of the communication control IC and a signal at the receiving terminal of same). Therefore, even if a collision of messages actually occurs, a node sending out dominant bits does not detect the collision but a node sending out recessive bits detects it.

If the answer to the question of the step S11 is affirmative (YES), i.e. if there occurs a collision of messages, the judgment as to acquisition of the token at the step S3 is canceled, and an error message formed by a sequence of dominant bits is transmitted at a step S12, and the Twt timer is reset at a step S13, followed by the program proceeding to the step S6 where the communication control IC is caused to wait or be on standby.

Also when the transmission of the message is completed without detecting any collision of messages, the Twt timer is reset, and then the program proceeds to the step S6 where the communication control IC is caused to wait or be on standby.

Further, reception of messages from other nodes is performed as interruption processing when the communication control IC is on standby (at the step S6), and when reception of each message is completed, the Twt timer is reset, followed by the communication control IC recovering a standby state.

By the processing of the FIG. 8 program, when the token is not generated on the bus 6 within the predetermined monitoring time period and at the same time the bus 6 is idle, a node which has not detected a collision of messages acquires the token, whereas a node which has detected a collision of messages repeatedly carries out the same judgment after the lapse of a predetermined waiting time period Twt specific thereto. Therefore, if the time period from the time the power is turned on to the time the ECU comes into an operative state is different between ECU's, the ECU which is the earliest to rise acquires the token, which makes it possible to generate the token at early timing.

The processing of the FIG. 8 program effectively functions even when the token has disappeared due to failure of a node which holds the token. Therefore, even in such an event, the token can be generated at early timing.

FIG. 9 shows a case in which when the power is turned on, the node having the address 1 and the node having the address 4 rise almost at the same time (as shown in (c) and (e) of the figure), and the node having the address 3 rises slightly later (as shown in (d) of same).

In this example, the node having the address 4 detects a collision of messages at the field F2 (TKNAD) since a signal transmitted therefrom does not agree with a signal on the bus, and then transmits an error message formed by a sequence of dominant bits, followed by entering a standby state (waiting time period Twt=5×Twt0). The node having the address 3 detects a signal on the bus before the predetermined monitoring time period Ttk elapses, and hence enters a standby state (waiting time period Twt=4×Twt0).

The node having the address 1 detects a collision of a message transmitted therefrom with the error message transmitted from the node having the address 4, and enters a standby state (waiting time period Twt=2×Twt0), similarly to the node having the address 4. Thereafter, the node having the address 1 starts to transmit the message again after the waiting time period 2Twt0 specific thereto has elapsed. At this time, the nodes having the addresses 3 and 4 are still on standby, and hence no collision of messages occurs, which enables the node having the address 1 to acquire the token.

Industrial Applicability

As described in detail heretofore, according to the data transmission system of the present invention, when one control unit determines that the transmission right has not been circulated in the system for a predetermined time period, and at the same time the network bus is idle, the one control unit judges that it has acquired the token, and starts to transmit a message. As a result, the transmission right can be generated in a short time both when the power is turned on and when the transmission right has disappeared.

Further, according to the data transmission system of the present invention, if a control unit detects a collision of a message being transmitted thereby with any other message during transmission of the message, the message-transmitting processing is carried out again after the lapse of a waiting time period specific thereto. As a result, even if two or more control units start to transmit messages almost at the same time, it is possible to properly cope with an inconvenience resulting therefrom.

We claim:

1. A data transmission system for an automotive vehicle for transmitting messages between a plurality of control units installed on said automotive vehicle, by connecting said control units with each other by a network bus and circulating a transmission right therebetween, characterized in that each of said control units comprises:

transmission right circulation-determining means for determining that the transmission right has not been circulated for a predetermined time period, idle state-detecting means for detecting an idle state of said network bus, message-transmitting means for judging that said each control unit has acquired said transmission right when it is determined that the transmission right has not been circulated for said predetermined time period, and at the same time said idle state of said network bus has been detected, to transmit a message to said network bus, collision-detecting means for detecting a collision of said message transmitted therefrom with any other message, and waiting time period-setting means for setting a waiting time period specific to said each control unit, said message-transmitting means inhibiting transmission of the message when said collision of said message has been detected, and carrying out said message-transmitting processing again if said network bus is idle after said lapse of said waiting time period.

2. A data transmission system for an automotive vehicle according to claim 1, wherein said waiting time period-setting means determines said waiting time period according to a value specific of said each control unit.

* * * * *